(12) United States Patent
Arai

(10) Patent No.: US 6,496,893 B1
(45) Date of Patent: Dec. 17, 2002

(54) APPARATUS AND METHOD FOR SWAPPING DEVICES WHILE A COMPUTER IS RUNNING

(75) Inventor: Susumu Arai, Sunnyvale, CA (US)

(73) Assignee: Phoenix Technologies Ltd., San Jose, CA (US)

(*) Notice: Subject to any disclaimer, the term of this patent is extended or adjusted under 35 U.S.C. 154(b) by 0 days.

(21) Appl. No.: 09/258,409

(22) Filed: Feb. 26, 1999

(51) Int. Cl.[7] .............................................. G06F 13/00
(52) U.S. Cl. ........................ 710/302; 710/104; 713/100
(58) Field of Search ................... 710/301–304, 710/104, 8, 10; 713/1, 2, 100

(56) References Cited

U.S. PATENT DOCUMENTS 5,781,798 A   7/1998  Beatty et al.
5,793,979 A   8/1998  Lichtman et al.
5,794,032 A   8/1998  Leyda
6,138,194 A * 10/2000  Klein et al. .................. 710/103
6,311,242 B1 * 10/2001  Falkenburg et al. ......... 710/103

OTHER PUBLICATIONS

Karen Hazzah, "Writing Windows VxDs and Device Drivers," 2d edition, R&D Books, 1997.

"Method to Dynamically Bind Device Drivers," IBM Technical Disclosure Bulletin, vol. 28, No. 2, Jul. 1985, p. 617, IBM Corp., New York, US.

* cited by examiner

Primary Examiner—Paul R. Myers

(57) ABSTRACT

A system for exchanging devices installed in a computer system allows users to make an exchange of devices while the computer system is running or in a sleeping state. The system is able to recognize, access and use the newly added device without restarting or rebooting the computer system.

31 Claims, 5 Drawing Sheets

APPARATUS AND METHOD FOR SWAPPING DEVICES WHILE A COMPUTER IS RUNNING

FIELD OF THE INVENTION

The invention relates generally to the field of interconnecting devices with a computer, and more specifically, to swapping or changing the devices interconnected with a computer while the computer is in operation.

BACKGROUND OF THE INVENTION

Drivers for fully "plug-and-play" operating systems and devices can handle the addition and removal of devices with little to no active involvement of the user. As a result, fully "plug-and-play" systems allow relatively unsophisticated users to install and exchange devices both easily and seamlessly, and without any need for the user to understand the software or have programming capability.

Within each operating system, there are a series of drivers for discovering and initializing devices included in a computer so that they can properly communicate with all of the resources of the computer. For operating systems, such as Windows 95® or 98® (products of Microsoft Corporation), the drivers enumerate or recognize the devices connected to the computer when the driver is started during the installation or booting up of the operating system. For some devices, however, their associated device driver is not fully "plug and play" enabled. Examples of these drivers include the IDE driver for hard disk drives and the floppy driver for floppy drives. Because these drivers are not fully "plug and play" enabled, the drivers for these devices are unable to enumerate the devices during runtime.

Due to this limitation, these operating systems cannot support the swapping of devices having not fully "plug and play" drivers, such as hard drives, CD-ROM drives and floppy drives, while the system is running (hot swapping) or in a sleeping state (warm swapping). Rather, the swapping or exchange of one of these devices for another requires the user to restart or reboot the computer. This requirement is both time-consuming and inconvenient to the user.

SUMMARY OF THE INVENTION

Briefly, the present invention comprises a method for enumerating a first device present in a computer system to make the first device recognizable to the computer system, the computer system having a memory and an operating system which uses a data structure stored in the memory for establishing a working configuration of the computer system, the data structure having one or more device nodes corresponding to devices present in the computer system, the method including the steps of providing an indication to the operating system that the first device has been inserted into the computer system while the computer system is in operation, enumerating a controller for controlling the first device in response to the indication, initializing a driver associated with the first device controller in response to the enumeration of the first device controller, locating, with the initialized driver, an enumerator associated with the first device controller, and enumerating the first device with the located enumerator, wherein the driver associated with the first device controller is only capable of locating the enumerator associated with the first device controller when initialized.

In another aspect of this method, prior to the step of connecting the first device, the method further includes the steps of determining whether a second device in the computer system is currently being accessed, removing the device node corresponding to the second device and a device node corresponding to a controller for controlling the second device from the data structure, isolating any data signals which are transmitted between the second device and the second device controller from being transmitted from the second device controller to the second device, and powering off the second device.

In yet another aspect of this method, the step of removing the device nodes corresponding to the second device and the second device controller includes the substep of unloading all drivers associated with the second device and the second device controller.

In a further aspect of the present invention, a computer program product comprises a computer usable medium having computer readable program code modules embodied therein for enumerating a first device present in a computer system to make the first device recognizable to the computer system, the computer system having a memory and an operating system which uses a data structure stored in the memory for establishing a working configuration of the computer system, the data structure having one or more device nodes corresponding to devices present in the computer system, the computer program product including a first enumeration module for enumerating a controller for controlling the first device after inserting the first device into the computer system while the computer system is in operation, an initialization module for initializing a driver associated with the first device controller in response to the enumeration of the first device controller, a locator module for identifying, with the initialized driver, an enumerator associated with the first device controller, and a second enumeration module for enumerating the first device with the located enumerator associated with the first device controller, wherein the driver associated with the first device controller is only capable of locating the enumerator associated with the first device controller when initialized.

DETAILED DESCRIPTION OF THE PREFERRED EMBODIMENT

The present invention will be described in the context of a specific embodiment, but the invention is not intended to be so limited.

Figure 1:
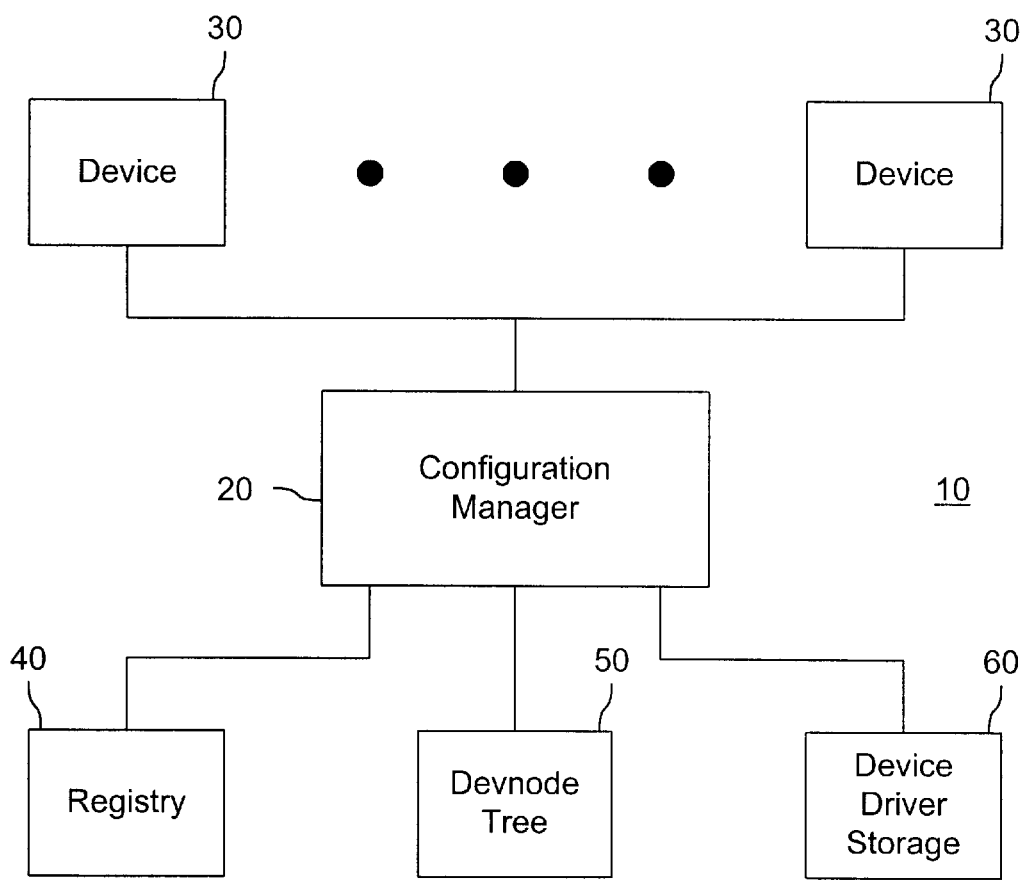
FIG. 1 is a block diagram of a computer system consistent with the present invention.

FIG. 1 shows how the components of a computer system 10 consistent with the present invention fit together. As shown in FIG. 1, computer system 10 includes a configuration manager 20, a plurality of devices or resources 30, a registry 40, a devnode tree 50, and a device driver storage 60. See the definitions to follow for the foregoing elements. Computer system 10 is preferably implemented in a Plug and Play framework. Although not shown in FIG. 1, computer system 10 includes other elements, such as a processor, a memory, a monitor, and an input device, like a keyboard or pointing device. Additional elements may also be included in computer system 10 as is known in the art.

The following are definitions for these elements in computer system 10. "Configuration manager" 20, which can be implemented as a virtual device driver (VxD), is the central component of a plug and play framework. VxD is a driver specifically formatted for Windows 95 and 98. Other drivers, including DLL and DOS TSR formats, are also possible. Configuration manger 20 directs all configuration management in computer system 10. To direct the configuration management, it can use three data stores: registry 40, devnode tree 50 and device driver storage 60, and can work with four software components: enumerators, arbitrators, device loaders and device drivers.

"Enumerators" determine which hardware devices are currently installed in computer system 10 and what resources they require. Accordingly, enumeration is the discovery or identification of a device. Like configuration manager 20, enumerators can also be implemented as VxDs. After identifying each device, an enumerator creates a "device node." A device node is a data structure containing basic information about an identified device. The device node can contain fields indicating possible configurations, current configuration, status information, and the driver for the device.

After an enumerator has identified a new device, a module called a "device installer" creates a new entry in "registry" 40. Registry 40 stores a hierarchical tree of entries, which include keys and values, for each device which has ever been installed in computer system 10. The key for each entry is an identification for a respective device, and the values in each entry include information about the type of device and its description, which drivers should be loaded for a particular device when enumerated, driver revision number, manufacturer, and potential logical configurations of the device. The information for the values can come from a device information file supplied by the vendor with a device or from the device itself "Device information files" contain information about known devices and their configurations. To create the device node for a device which has just been installed in the system, the enumerator can use the information corresponding to an entry for the device in registry 40.

Each device node created by an enumerator is placed in "devnode tree" 50. Devnode tree 50 is a hierarchical tree of device nodes that describes all of the hardware present in computer system 10. The hierarchy in devnode tree is structured such that device nodes are placed in the hierarchy under the device node for the device controlling these device nodes to thereby provide an indication of control. For example, the device nodes for devices controlled by a bus are placed under the device node for the bus. Device nodes, like the device node for the bus, are called parent nodes, whereas the device nodes controlled by a parent node, like the devices connected to the bus, are child nodes.

After an enumerator identifies a device and creates its device node, configuration manager 20 invokes a "device loader" associated with the device. A device loader, which can be implemented as a VxD, loads and manages device drivers and enumerators for a given device node. Device loaders are typically used when devices are managed by various layers of device drivers. The device loader coordinates the work of the various layers and carries out general configuration tasks that apply to all device drivers.

A "device driver" controls and manages the device hardware. Devices drivers are responsible for identifying the specific resource requirements of a given device and for setting the device to operate with the configuration assigned by configuration manager 20. The device drivers for all devices 30 which have been installed in computer system 10 can be stored in device driver storage 60.

Finally, "arbitrators," which can also be implemented as VxDs, are used by configuration manager 20 to resolve resource conflicts between devices 30. An arbitrator reviews a list of requirements for devices 30 installed in computer system 10 and finds the best allocation of resources to satisfy all of the devices. The arbitrators make conflict-free assignments for several resources in computer system 10, including input/output (I/O) addresses, memory addresses, interrupt requests (IRQs), and direct memory access (DMA) channels.

It should be noted that arbitrators, enumerators, registries, devnode trees, configuration managers and device loaders are standard items of software provided by a variety of software vendors, including by Microsoft Corporation in Windows 95 and Windows 98.

The following is a more detailed description of the data stores and software components used by configuration manager 20 in computer system 10. The building blocks for establishing a working configuration of computer system are the device nodes. As noted above, a device node is the basic in-memory representation of a device 30 that is physically present on the system. It is a data structure which contains information relating to the device and its drivers. The information stored in a device node includes the device identification (ID), its currently assigned configuration, possible logical configurations, status information, and a device driver entry point. As noted above, device nodes are created by enumerators. In response to the creation of a device node, configuration manager 20 causes the appropriate driver to be loaded.

A "device ID" used in the device node data structure is an ASCII string unique to each device 30 that may be included in computer system 10. The string typically identifies the component that found the device, but because it is also serves as a key in registry 40, it must be unique within computer system 10 so that information about the device can be retrieved reliably. This string can be used to cross-reference data about the device stored in registry 40.

The following are examples of device IDs: Root\*PNP0000\0; ISAPNP\ADP1522_DEV0000\E8124123; BIOS\*PNP0100\0; and PCMCIA\MEGAHERTZ-XJ124FM-936B. As seen from these examples, the first part of the ID identifies the component that found the device. For example, ISAPNP would correspond to the ISA bus for Plug and Play devices. This naming scheme for device IDs is a bus-specific naming scheme.

As discussed above, enumerators are the components that identify installed hardware and create device nodes. In computer system 10, each of the busses includes an enumerator invoked by configuration manager 20 for locating devices on its respective bus. These busses include PCI, EISA, PCMCIA, SCSI, and others. Devices on these busses are generally configured to fully support Plug and Play. An ISA bus can also be configured to support Plug and Play, and is referred to as a ISAPNP bus. Device nodes for the devices identified on the busses can have enumerators of their own to create child nodes on devnode tree 50. Any of these child device nodes can have an enumerator that creates on devnode tree 50 further children of that device node.

To identify devices configured for standard ISA busses which are not Plug and Play enabled, sometimes referred to as Legacy devices, configuration manager 20 can use detection modules instead of enumerators. Detection modules can use methods to identify a Legacy device, such as examining hard-coded I/O locations for expected values to detect devices like a keyboard or interrupt controller.

Enumerators are responsible for creating device IDs for the devices they locate. As noted above, each identifier should be unique and be consistently the same on each system boot. The string should be constructed so that it can serve to identify a unique entry in registry 40. The string generally starts with the enumerator's name followed by a backslash. For example, the ISA Plug and Play enumerator can start all device identifiers with "ISAPNP\."

Enumerators build devnode tree 50 and may participate in configuring the devices 30 on the bus associated with a respective enumerator. In most operating systems, an enumeration process takes place every time the computer starts. At the end of the enumeration process, devnode tree 50 includes information about available system resources, required device drivers, and other requirements for those resources.

Devnode tree 50 is a hierarchical tree of device nodes representing the structure of the hardware in computer system 10. Accordingly, a device node is either at the root of devnode tree 50 or is the child of a parent device node. A device node can have multiple child device nodes. The other children of a device node's parent are called siblings. Devnode tree 50 is built each time the computer is started. Furthermore, it can be completely dynamic, changing even while the computer is running if a device 30 is removed or added to computer system 10.

Devnode tree 50 provides several functions for computer system 10. First, it describes all hardware that is present in computer system 10. In addition, devnode tree 50 provides a mechanism for enumerators to configure their children's hardware, allowing bus independent drivers. The drivers can be bus independent because the enumerators for each bus can identify and configure the devices controlled by the bus independently of the other busses. Normally, drivers do not know or care about their exact location within the tree. Drivers typically are only concerned with their own hardware device or device node, and are oblivious to the layers above or below them in the tree.

Devnode tree 50 contains configuration information for all devices 30 in computer system 10, and configuration manager 20 uses it to keep track of the resources associated with each device 30, such as interrupt requests (IRQs), input/output (I/O) ports and even non-sharable resources like SCSI identifiers. Devnode tree 50 describes existing devices and resources, resource requirements, resource interdependencies, and current resource allocations.

Table I shows an example of a devnode tree illustrating device IDs of some typical devices and where in the hierarchy one might expect to find them. The actual contents of each device node other than the device ID are not shown.

TABLE I

Example of a Devnode Tree

Htree\Root\0 - Root node of devnode tree
    \Root\*PNP0801\0 - Old-style Sound Blaster compatible sound device
    \Root\*PNP0C00\0 - Plug and Play BIOS
        \BIOS\*PNP0901\0 - Super VGA compatible display adapter
        \BIOS\*PNP0000\0 - AT Interrupt Controller
        \BIOS\*PNP0100\0 - AT Timer
        \BIOS\*PNP0200\0 - AT DMA Controller
        \BIOS\*PNP0301\0 - PS/2 Style Keyboard Controller
        \BIOS\*PNP0400\0 - Standard LPT printer port
        \BIOS\*PNP0400\1 - Standard LPT printer port
        \BIOS\*PNP0501\0 - 16550 COM port
        \BIOS\*PNP0501\1 - 16550 COM port
        \BIOS\*PNP0700\0 - PC standard floppy disk controller
        \BIOS\*PNP0800\0 - AT style speaker sound
        \BIOS\*PNP0901\0 - SVGA compatible display adapter
        \BIOS\*PNP0B00\0 - AT Real Time Clock
        \BIOS\*PNP0C01\0 - System memory
        \BIOS\*PNP0E00\0 - PCMCIA Controller
            \PCMCIA\3C08SF\0 - Network adapter As shown in Table I, the Root node is a parent node to the Sound Blaster and Plug and Play BIOS. The Plug and Play BIOS, in turn, has a series of child nodes. An enumerator for the Plug and Play BIOS would identify each of these devices and create a device node for each device, where each device node is a child to the Plug and Play BIOS device node. As discussed above, this hierarchical structure shows that each of these child nodes is controlled by the Plug and Play BIOS. Similarly, an enumerator for the PCMCIA controller would identify the network adapter, which is controlled by the PCMCIA controller, and create a device node for the network adapter as a child node to the PCMCIA controller.

Computer system 10 also uses and extends a registry 40 and various device information files (with the .INF filename extension). Registry 40 stores information about all devices 30 ever installed on a particular machine, including devices that are not fully Plug and Play enabled, such as Legacy devices. Registry 40 also stores information about Plug and Play devices which have been located by an enumerator, device-specific state information, bindings of devices to device drivers, and data about the last known configuration—which is used to accelerate the allocation of resources.

The device information files noted above contain information about known devices and their configurations. Computer system 10 can provide some class-information files (for example, SCSI.INF and MODEM.INF); others are provided by the device manufacturer. When a new device is detected or enumerated by an enumerator, all known .INF files are searched for entries matching the device ID. When a match is found, the appropriate files are copied and the required data is copied into a newly created registry entry in registry 40.

Registry 40 is a system-wide database, accessed in Windows 95, Windows 98 and Windows NT® through the Microsoft Win32® API set. Additionally, Windows 95 and Windows 98 provide real-mode access to registry 40 to allow its use during boot-up prior to the switch to protect mode. As noted previously registry 40 stores a hierarchical tree of "Keys" and "Values," similar to entries in Windows 3.1—format .INI files (except that Windows 3.1 .INI files have a flat structure, as opposed to the tree structure of the registry.) The operating system uses registry 40 to store information about which drivers should be loaded when a particular device is enumerated, as well as such information as the driver revision number, manufacturer, and potential logical configurations of the device. Table II, below, shows an exemplary registry entry.

TABLE II

Examples of a Registry Entry

\HKEY_LOCAL_MACHINE\ENUM\ROOT\*PNP0000\0000
    DrvDesc="Programmable Interrupt Controller"
    Class="System"
    BootConfig=(I/O ports 20h, 21h, A0h, and A1h -
    binary resource data)
    Driver="System\0000"
    HardwareID="*PNP0000"
    InfName="MACHINE.INF"
    Mfg="Microsoft"
    NoSetupUI="1"
ENUM\BIOS\*PNP0000\0000\LogConfig
    0=(Binary resource data, in this case as BootConfig above)
SYSTEM\CurrentControlSet\Services\Class\System\0000
    DriverDesc="Programmable Interrupt Controller"
    DevLoader\="*VPICD"
EnumPropPages="Sysclass.dll,EnumPropPages"

The registry entry in Table II shows an example of information that may be included in registry 40 for a particular device. In this example, the device is a programmable interrupt controller. The information for this device includes a possible boot configuration, a device driver associated with the device, a unique ID, the name of the device's information file, and a device loader for loading the device driver of the device.

Most Plug and Play registry entries are stored in the ENUM tree of registry 40, that is, \HKEY_LOCAL_MACHINE\ENUM. Under ENUM, each enumerator gets its own branch, with one child under the enumerator for each device it has ever enumerated and set up. There is one special enumerator branch called ENUM\ROOT which contains the registry entries for non-Plug and Play hardware, such as Legacy devices, for which there is no enumerator but which can be detected using other means as discussed above. For example, when the operating system is installed, detection modules are loaded based on a list in an information file, such as the MSDET.INF information file. When a device is detected that is not fully enabled for Plug and Play, information about it is retrieved from the appropriate device information file in registry 40. This information is then stored in a new node created under the HKEY_LOCAL_MACHINE\ENUM\Root branch in registry 40.

A device installer creates new entries in registry 40 when an enumerator or detection module detects a device for which there is no registry entry in registry 40. Most of the information is provided either by the .INF file provided with the device or directly by the device's setup module. Registry 40 also stores configuration-specific information, which is information relevant to whether a capable portable computer is docked or undocked, as well as user-specific information.

The distinction between devnode tree 50 and registry 40 is important. In a fully Plug and Play system, devnode tree 50 is an accurate hierarchical representation of the currently installed devices. By contrast, registry 40 contains information for all devices ever installed (even if they are not currently present). The location of a device in registry 40 does not fully reflect the hierarchical structure described in devnode tree 50. In registry 40, devices are located beneath their enumerator, but all enumerators are kept in a flat list, meaning that enumerators are not kept in a hierarchical structure according to the enumerator that identified their associated device. Devnode tree 50 exists in memory only, whereas registry 40 is saved on disk.

As noted previously, a device driver controls and manages the device hardware. Device drivers are responsible for identifying the specific resource requirements of a given device 30 and for setting that device to operate with the configuration assigned by the configuration manager 20. Configuration manager 20 provides services and messages that a device driver can use to carry out its tasks.

A device driver examines the portion of the device node in devnode tree 50 representing the assigned configuration of its device to determine which resources have been allocated for the device. For Plug and Play cards, the assigned resources for a given device may change from one boot to the next, or even while computer system 10 is running (dynamically). Logical configurations describe the various configurations that are valid for a given piece of hardware. Information about the state of a device, such as whether it is disabled or configured, is maintained by configuration manager 20 in each device node in devnode tree 50. Drivers can query this information by querying configuration manager 20 for the information. When a driver is loaded for a specific device node, it registers with configuration manager 20, passing an entry point for the device that will be called to assign or change hardware configurations. Although a device driver or other component cannot access devnode tree 50 or the device nodes directly, it can retrieve information about the identity of a device node and carry out tasks that retrieve and set information in the device node. Configuration manager 20 provides these services to carry out tasks on a device node. However, device drivers and other components can store information about a given device node in registry 40 as well as retrieve information about a device node stored in registry 40 by configuration manager 20.

A device loader loads and manages device drivers and enumerators for a given device node. Device loaders are typically used when devices are managed by various layers of device drivers. The device loader coordinates the work of the various layers and carries out general configuration tasks that apply to all device drivers.

A device loader can be associated by configuration manager 20 with a given device node. The device loader can also load an enumerator and device driver for the given device node or any child device nodes. Other services include retrieving and assigning private values to device nodes and retrieving the device descriptor block for any dynamically loaded virtual device associated with a device node.

Arbitrators are the components that assign ownership of various resources, such as IRQs and I/O ports. Resource arbitrators resolve resource conflicts between devices. An arbitrator reviews a list of requirements for devices and finds the best allocation of resources to satisfy all devices. Configuration manager 20 also provides services and messages to support the operation of resource arbitrators.

The list of requirements identifies the type resources a device 30 needs to successfully operate and any constraints associated with those resources. IRQs, I/O ports, DMA channels and memory ranges are examples of types of resources. Constraints are often resource interdependencies, such as a device 30 requiring that it must see IRQ3 and I/O port 02F8 in combination in order to operate successfully.

A logical configuration is a description of the resources required by a device 30 to operate successfully. Any given device 30 can have several possible logical configurations. Configuration manager 20 uses the logical configurations of a device 30 to determine how to allocate resources among competing devices. Configuration manager 20 provides services that device drivers, enumerators, and other components can use to examine and create logical configurations.

A resource descriptor describes the resources in a logical configuration. There are resource descriptors for memory, I/O ports, DMA channels, and IRQs. Other resource descriptors can be created as needed to identify other types of resources available to devices.

The memory resource descriptor identifies memory address ranges. This descriptor contains a MEM_DES structure that describes a memory resource and an array of MEM_RANGE structures that identify the possible memory configurations for each device. The I/O port resource descriptor identifies I/O port address ranges. It contains an IO_DES structure that describes the I/O port resource and an array of IO_RANGE structures that identify the possible port configurations.

The DMA channel resource descriptor identifies a set of DMA channel alternatives. This descriptor is a DMA_DES structure that identifies the DMA channels that the device can use. Finally, the IRQ resource descriptor identifies a set of IRQ alternatives. It is a IRQDES structure that identifies the IRQs the device can use and whether the IRQ can be shared.

When working with I/O port resource descriptors, the IOR_Alias and IOR_Decode values specify the port aliases to which a device responds. A port alias is an address that a device 30 responds to as if it were the actual address of an I/O port. Additionally, some cards will actually use additional ports for different purposes, but use a decoding scheme that makes it seem as though they were using aliases; for example, an ISA card may decode 10 bits and require 03C0h. This card would need to specify an IOR_Alias offset of 04h and a IOR_Decode of 3 (no aliases are used as actual ports). For convenience, the alias field can be set to zero to indicate that no aliases are required; in this case, the decode field is ignored.

If the card were to use the ports at 7C0h, 0BC0h, and 0FC0h, where these ports have different functionality, the IOR_Alias value would be the same and the IOR_Decode value would be 0Fh, indicating that bits 11 and 12 of the port address were significant. Thus, the allocation is for all of the ports (PORT[i]+(n*alias*256)) & (decode*256|03FFh), where n is any integer and PORT is the range specified by the IOR_nPorts, IOR_Min, and IOR_Max fields. Note that the minimum alias is 4 and the minimum decode is 3.

Because of the history of the ISA bus, it is assumed that all EISA and ISA cards that use any port where PORT= n*400+Z (where "Z" is a port in the range 100h–3ffh, and "N" is greater than or equal to 1) will reserve port Z and treat the other port(s) as aliases. If a port that falls in this set is reserved but the driver does not reserve the "Z" address, it is assumed that the device is on a local bus (such as PCI) where the reserved port address is not presented on the ISA bus.

A range list is a sorted list of I/O port or memory address ranges (in DWORD form) in which no two ranges overlap. Resource arbitrators that manage I/O and memory resources use the range list services to discover whether a given I/O or memory range conflicts with any other range. These services detect attempts to create range lists containing overlaps and either fail or create merged ranges where there would have been overlaps. Each range must specify a contiguous range of addresses, but the range lists itself can contain multiple ranges, none of which necessarily need to be contiguous with any other range in the list.

Working in conjunction with these components and resources, configuration manager 20 finds workable configurations for all devices 30 of computer system 10 so that each device 30 can use its assigned IRQ number, I/O port addresses, and other resources without conflict with other devices. Configuration manager 20 also helps monitor computer system 10 for changes in the number and type of devices 30 present and manages the reconfiguration of devices 30 as needed when changes take place. To create and maintain the configuration, configuration manager 20 works in conjunction with enumerators, resource arbitrators, device loaders, and device drivers. It provides services and messages that these components use to carry out their configuration tasks. Table III, below, shows a list of some of the services provided by configuration manager 20 and a description of each of these services.

TABLE III

Configuration Manager Services

| Service | Description |
| --- | --- |
| CONFIGMG_Create_DevNode | Adds a device node to the hardware tree. |
| CONFIGMG_Disable_DevNode | Disables a device node in the hardware tree. |
| CONFIGMG_Enable_DevNode | Enables a device node in the hardware tree. |
| CONFIGMG_Query_Remove_SubTree | Checks whether a device node and its progeny can be removed. |
| CONFIGMG_Reenumerate_DevNode | Causes the enumerator of the specified device node to receive the CONFIG_ENUMERATE enumerator function. |
| CONFIGMG_Remove_SubTree | Removes a device node and its children. |

These services can be used in computer system 10 to enable it to accommodate the insertion and recognition of devices 30 in computer system 10 while computer system 10 is in operation. In addition to the services shown in Table III, there are many other services which can be used in computer system 10 that are standard in Windows 95 and 98. "Writing Windows VxDs and Device Drivers, 2nd edition" by Karen Hazzah (published by R&D Books in 1997) provides a more complete description of a Plug and Play framework and its components, and is hereby incorporated by reference.

Figure 2A:
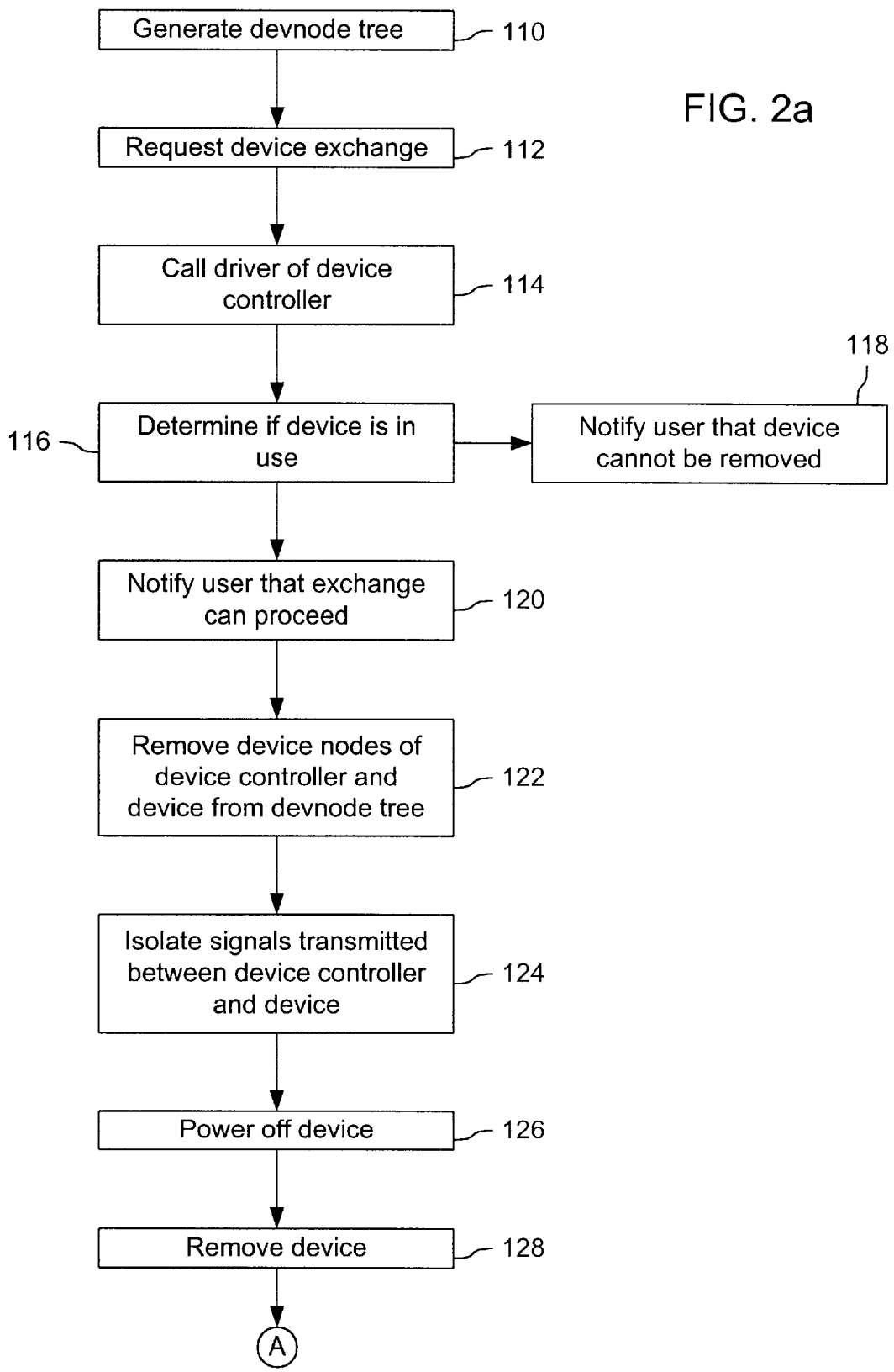
FIGS. 2a and 2b are block diagram flowcharts of a swapping process consistent with the present invention.
Figure 2B:
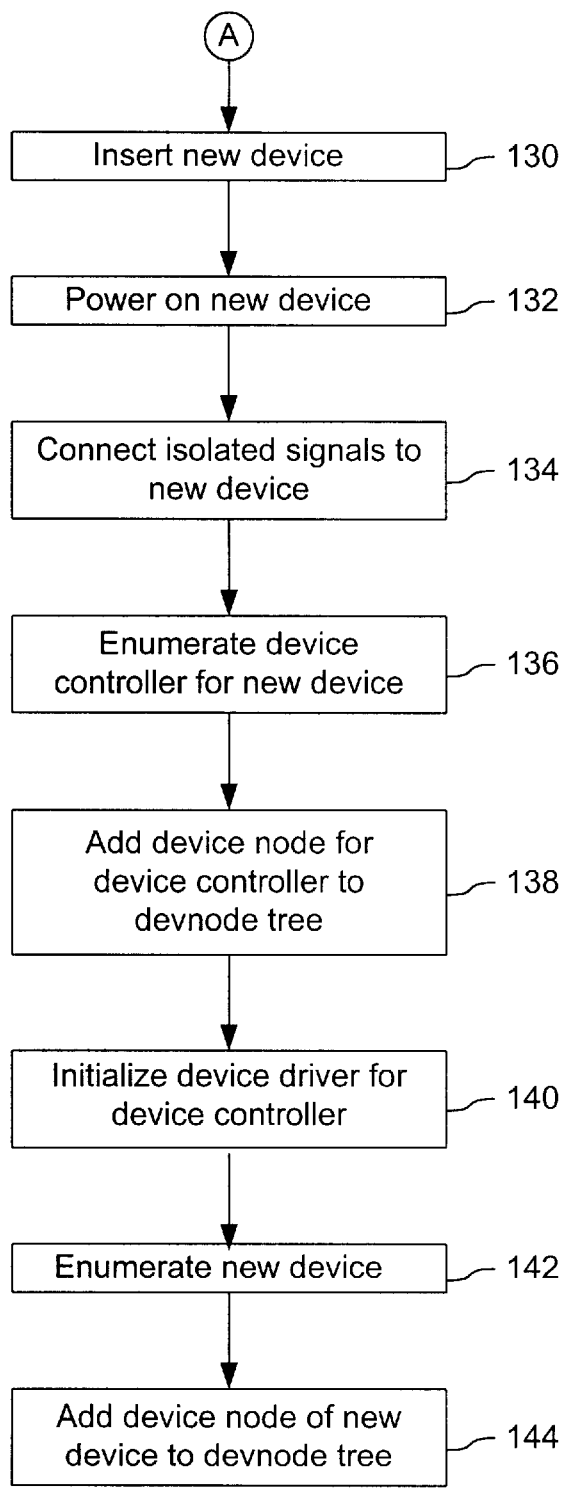

FIGS. 2a and 2b are flow diagrams of a process consistent with the present invention for removing and inserting devices in computer system 10 while in operation for devices having not fully "plug and play" enabled drivers. This process can be implemented as a software program, a hardware device wired to perform the process, such as a programmable memory, firmware or processor, or some combination thereof Referring to FIG. 2a, when computer system 10 is booted up, configuration manager 20 generates devnode tree 50 using the enumerators, device nodes, device drivers and registry 40 (step 110).

While computer system 10 is running (hot swapping) or in a sleeping state (warm swapping), a user of computer system 10 can request that a device currently present in computer system 10 be exchanged or swapped for a different device (step 112). To make this request, a user can query computer system 10 through a windows-type interface or any other type of interface consistent with the operating system being utilized by computer system 10. In the request, the user can specify the device to be removed and the new device to be inserted. Alternatively, if no device is being removed, then the user can merely specify the device being inserted. In response to the request, configuration manager 20 makes a call to a driver for the controller of the device the user has requested to remove (step 114). This call can be made using the CONFIGMG_Query_Remove_SubTree service. The device controller can be, for example, an IDE controller if the device to be removed is a hard drive, or a floppy controller if the device to be removed is a floppy driver. Other controllers are also possible, depending upon the type of device being removed.

The driver for the device controller determines if the device to be removed is currently in use (step 116). For example, if the device is a disk drive, the driver would determine if a file on the drive is currently open. To make the determination, a CONFIGMG_Query_Remove_SubTree call or query can be made. In the example of a disk drive, the disk drive can be accessed through several layers of drivers, such as a file system driver, a disk drive driver and a disk controller driver. Although the disk controller driver may be unaware of a file open on the disk drive, it can forward the query regarding the status to other driver layers which can make the determination.

If the device is currently in use, the user is notified through the interface that the device cannot be removed (step 118). The device is determined to be currently in use if in response to the query, a CR_REMOVE-VETOED indication is returned. In the example of a disk drive, a message may be provided to the user to close the file and retry the exchange after the file is closed. On the other hand, if the device is not in use, the user is notified via the interface that the exchange can go forward (step 120). The device is not in use if the indication returned is CR_SUCCESS.

Before the device is removed, configuration manager 20 removes all the device nodes from devnode tree 50 associated with the device controller to be removed and all the devices controlled by the device controller, including the device to be removed (step 122). This can be done using the CONFIGMG_Remove_SubTree service. As a result of this operation, all the drivers and drive letters related to the removed device nodes are unloaded from computer system 10. For example, the removal of the device nodes for a floppy disk drive and its controller would remove their associated drivers and drive letter, such as the "a" drive.

In the event that the devices being exchanged are controlled by the same controller, such as a CD-ROM and a hard drive which are both controlled by an IDE controller, then only the device node for that controller is removed. However, if the devices being exchanged are controlled by different controllers, then it is necessary to remove the device node for both controllers. If a new device is being inserted without removing another device, it is only necessary to remove the device node for the controller that controls the new device.

After the device nodes have been removed, the signals transmitted between the device to be removed and its controller are isolated (step 124). To perform this signal isolation, a circuit may be integrated into the controller or may be added to computer system 10 between the controller and the device to be removed. This signal isolation circuit can be, for example, a switching device, which blocks the transmission of signals between the controller and the associated device to be removed when switched off. The switch control for the signal isolation circuit would be responsive to an indication that the device could be exchanged. Although the signal isolation is not required, it is preferably included to avoid possible damage to the controller and the device to be removed. In the event that the devices being exchanged are controlled by different controllers, it would also be necessary to isolate the signals for the controller of the device to be inserted. The isolation of the signals for the controller of the device to be inserted is also necessary if the device to be inserted is not being exchanged for another device.

In addition to isolating the signals transmitted between the device and its controller, the device being removed is powered off (step 126). Once the signals have been isolated and the device has been powered off, the user can remove the device from computer system 10 (step 128).

As shown in FIG. 2b, after the user has removed the device from computer system 10, the user can insert the new device (step 130). Before making this exchange, an indication may be provided to the user through the interface that computer system 10 is ready for the exchange to proceed.

Before powering on the new device and reconnecting the isolated signals, the user can provide an indication via the interface that the new device has been inserted. Alternatively, a sensor circuit may be included in computer system 10 to sense or determine that the new device has been inserted, and provide the indication that the new device has been inserted.

Given the indication that the new device has been inserted, the new device is powered on (step 132) and the isolated signals from the aforementioned controller are reconnected to the new device (step 134). In response to this indication, configuration manager 20 then instructs an enumerator to enumerate or identify the controller for the newly added device (step 136). This enumerator would correspond to the bus to which the controller for the new device is connected. The enumeration can be done using the CONFIGMG_Reenumerate_DevNode system call. By re-enumerating the controller, the controller for the new device is located and its device node is added to devnode tree 50 (step 138). If the devices being exchanged are controlled by different controllers, then the controller for the removed device is also re-enumerated.

After adding the device node for the controller to devnode tree 50, the driver corresponding to the controller is also initialized (step 140). As discussed above, the devnode for the controller can include information regarding the location of the driver for the controller. During initialization of the driver, the driver for the controller locates the enumerator associated with the controller, which enumerates the new device as being connected to that controller (step 142). As a result of this enumeration, the device node corresponding to the new device is also added to devnode tree 50 (step 144). With the device node for the new device present in devnode tree 50, computer system 10 is able to recognize and use the new device as if the new device had been installed at bootup.

As discussed above, operating systems, such as Windows 95 and 98 are unable to recognize and initialize devices having drivers that are not fully "plug and play" enabled when the devices are inserted if computer system 10 is running. Rather, these drivers are only able to enumerate the device when the corresponding driver is initialized, which traditionally occurs only during startup or installation of the operating system. In the process of FIGS. 2a and 2b, however, the drivers for the controllers and devices are unloaded and then re-initialized, which allows the newly installed device to be recognized and initialized even if computer system 10 is running or sleeping.

Figure 3:
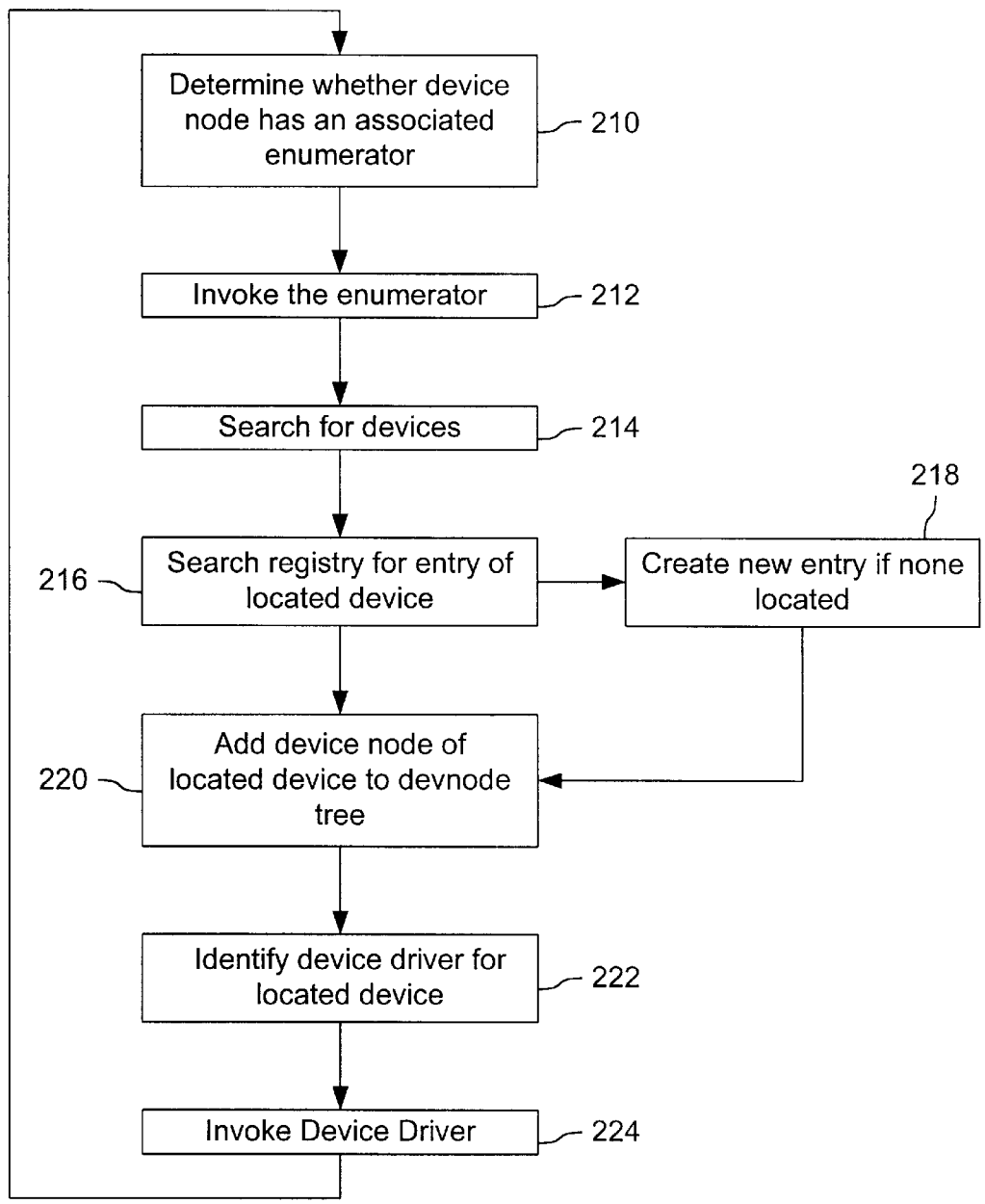
FIG. 3 is a block diagram flowchart of an enumeration process consistent with the present invention.

The process for recognizing devices present in computer system 10 relies on the use of enumerators. Enumerators can be associated with a particular device node, such as device nodes for busses or device controllers. In addition, at least one enumerator is associated with the root node of devnode tree 50. Configuration manager 20 uses this enumerator associated with the root node of devnode tree 50 to begin the enumeration process at start-up. The enumeration process, however, progresses in the same manner regardless of whether the enumerator is associated with the root node, a parent node or a child node. FIG. 3 shows a flow diagram of an enumeration process consistent with the present invention.

First, configuration manager 20 or a device driver associated with a device node determines whether a device node includes an associated enumerator (step 210). If not, then that device node cannot have any child nodes and associated devices to enumerate and invoke drivers therefor. On the other hand, if configuration manager 20 or the device driver determines that the device node includes an enumerator, the enumerator is invoked (step 212). The invoked enumerator then searches for any devices that are associated with or controlled by the device of the corresponding device node (step 214). If such a device is located, the enumerator searches registry 40 for an entry corresponding to the located device (step 216).

If no entry corresponding to the located device is found in registry 40, a module called a device installer creates a new entry in registry 40 for the located device (step 218). Once an entry is created for the device, it is treated in the same way as any other installed or previously installed device. If an entry is found or has been newly created, the enumerator adds the device node of that entry to devnode tree 50 (step 220). The device node for the located device added to devnode tree 50 is included as a child node to the device node having the enumerator which found the located device. For example, if the enumerator for the device node of an IDE controller locates a hard drive, the device node for the hard drive would be added as a child node to the device node for the IDE controller in devnode tree 50. The enumerator also identifies the device driver for the located device based on information in the device node (step 222) and uses this information to invoke the device driver (step 224). The process then repeats itself.

Figure 4:
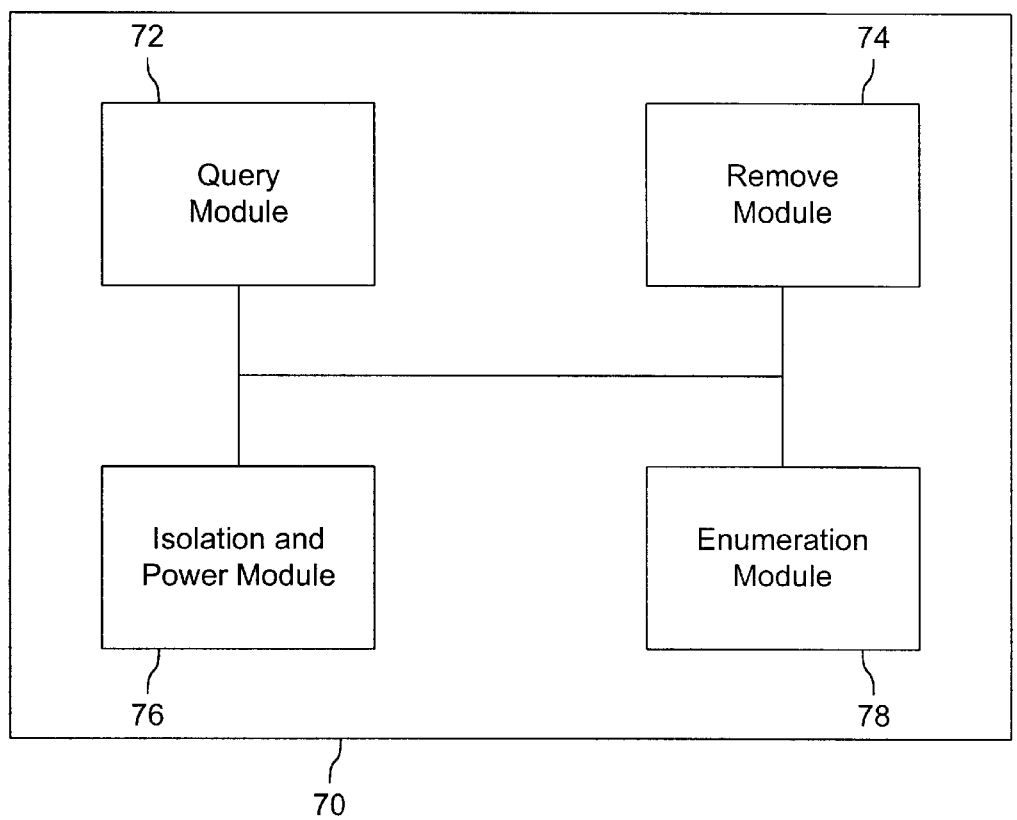
FIG. 4 is a block diagram of a device exchange system consistent with the present invention.

FIG. 4 shows a block diagram of a device exchanger 70 consistent with the present invention. Device exchanger 70 may be implemented as a software program, a hardware device, such as a programmable memory, firmware or processor, or some combination thereof. Device exchanger 70 can be included as part of a computer system, such as computer system 10 shown in FIG. 1. For example, if implemented as a software program, device exchanger can be loaded into a memory of computer system 10 when activated.

As shown in FIG. 4, device exchanger 70 includes a query module 72, a remove module 74, an isolation and power module 76 and an enumerate module 78. These modules can be loaded into a memory of computer system 10 while computer system 10 is in operation. In operation, a user of computer system 10 in FIG. 4 can make a request using an input device to exchange a device 30 installed in computer system 10 for another device. This request is received by query module 72 of device exchanger 70, which determines whether the device to be removed is currently being accessed (step 116 of FIG. 2*a*). If so, query module 72 informs the user through an interface, such as a monitor in computer system 10, that the device is currently being used and cannot be removed at that time (step 118 of FIG. 2*a*). If not being accessed, query module 72 informs the user that the exchange is acceptable (step 120 of FIG. 2*a*).

Before removing the device, remove module 74 removes the device node for the device and its associated controller from devnode tree 50 (step 122 of FIG. 2*a*). This removal also unloads all the drivers related to the device and the controller and the drive letters for the drive. In addition to removing the device node, isolation and power module 76 signals the isolation circuit, not shown, to isolate the signals which are transmitted between the device being removed and the controller (step 124 of FIG. 2*a*). Isolation and power module 76 also powers off the device being removed (step 126 of FIG. 2*a*).

After exchanging the devices, isolation and power module 76 receives an indication that the newly added device has been inserted, powers on the newly added device and signals the isolation circuit to reconnect the signals transmitted between the controller and the added device (steps 132 and 134 of FIG. 2*b*). Enumerate module 78, which also receives the indication that the newly added device has been inserted, then locates the controller for the newly added device and adds the device node for the controller into devnode tree 50 (steps 136 and 138 of FIG. 2*b*). This controller may be the same controller or a different controller than the controller for the removed device. The device driver associated with the device node for the controller is initialized and invokes the enumerator associated with the controller, which locates the newly added device and adds its device node to devnode tree 50 (steps 140, 142 and 144 of FIG. 2*b*). At this point, the newly added device is fully accessible to the rest of computer system 10.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and a practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for enumerating a first device present in a computer system to make the first device recognizable to the computer system, the computer system having a memory and an operating system which uses a data structure stored in the memory for establishing a working configuration of the computer system, the data structure having one or more device nodes corresponding to devices present in the computer system, said data structure being separate from a registry of the operating system, the method comprising the steps of:

providing an indication to the operating system that the first device has been inserted into the computer system while the computer system is in operation;

enumerating a first device controller for controlling the first device in response to the indication;

initializing a first device controller driver associated with the first device controller in response to the enumeration of the first device controller;

locating, with the initialized first device controller driver, an enumerator associated with the first device controller; and enumerating the first device with the located enumerator, wherein the first device controller driver is only capable of locating the enumerator associated with the first device controller when the first device controller driver is initialized.

2. The method according to claim 1, wherein the step of enumerating the first device controller includes the substep of adding a device node for the first device controller to the data structure.

3. The method according to claim 1, wherein the step of enumerating the first device controller includes the substep of locating the device node of the first device controller from a list of devices nodes stored in the memory of the computer system.

4. The method according to claim 1, wherein the step of enumerating the first device includes the substep of locating a device node of the first device from a list of device nodes stored in the memory of the computer system.

5. The method according to claim 4, wherein the step of enumerating the first device further includes the substep of adding the located device node of the first device to the data structure.

6. The method according to claim 1, wherein the step of enumerating the first device includes the substep of adding a device node of the first device to the data structure.

7. The method according to claim 1, further comprising the steps of:

powering on the first device after the first device has been connected to the computer system; and connecting any data signals which are transmitted between the first device and the first device controller.

8. The method according to claim 1, prior to the step of connecting the first device, further comprising the steps of:

determining whether a second device in the computer system is currently being accessed;

removing the device node corresponding to the second device and a device node corresponding to a controller for controlling the second device from the data structure;

isolating any data signals which are transmitted between the second device and the second device controller from being transmitted from the second device controller to the second device; and powering off the second device.

9. The method according to claim 8, wherein the step of removing the device nodes corresponding to the second device and the second device controller includes the substep of unloading all drivers associated with the second device and the second device controller.

10. The method according to claim 8, wherein the first device controller and the second device controller are the same controller.

11. The method according to claim 8, further comprising the step of connecting the isolated data signals to the first device.

12. The method according to claim 1, wherein the first device is one of a floppy drive, a hard drive, and a CD-ROM drive.

13. The method according to claim 1, wherein the first device controller is one of an IDE drive controller and a floppy drive controller.

14. The method according to claim 8, wherein the second device is one of a floppy drive, a hard drive, and a CD-ROM drive.

15. The method according to claim 8, wherein the second device controller is one of an IDE drive controller and a floppy drive controller.

16. A computer program product, comprising:
a computer usable medium having computer readable program code modules embodied therein for enumerating a first device present in a computer system to make the first device recognizable to the computer system, the computer system having a memory and an operating system which uses a data structure stored in the memory for establishing a working configuration of the computer system, the data structure having one or more device nodes corresponding to devices present in the computer system, said data structure being separate from a registry of the operating system, the computer program product comprising:
a first enumeration module for enumerating a first device controller for controlling the first device after inserting the first device into the computer system while the computer system is in operation;
an initialization module for initializing a first device controller driver associated with the first device controller in response to the enumeration of the first device controller;
a locator module for identifying, with the initialized first device controller driver, an enumerator associated with the first device controller; and
a second enumeration module for enumerating the first device with the located enumerator associated with the first device controller,
wherein the first device controller driver is only capable of locating the enumerator associated with the first device controller when the first device controller driver is initialized.

17. The computer program product according to claim 16, wherein the first enumeration module includes a submodule for adding a device node for the first device controller to the data structure.

18. The computer program product according to claim 16, wherein the first enumeration module includes a submodule for locating the device node of the first device controller from a list of devices nodes stored in the memory of the computer system.

19. The computer program product according to claim 16, wherein the second enumeration module includes a submodule for locating a device node of the first device from a list of device nodes stored in the memory of the computer system.

20. The computer program product according to claim 19, wherein the second enumeration module further includes a submodule for adding the located device node of the first device to the data structure.

21. The computer program product according to claim 16, wherein the second enumeration module includes a submodule for adding a device node of the first device to the data structure.

22. The computer program product according to claim 16, further comprising:
a power module for powering on the first device after the first device has been connected to the computer system; and
a switch module for connecting any data signals which are transmitted between the first device and the first device controller.

23. The computer program product according to claim 16, further comprising:
a query module for determining whether a second device in the computer system is currently being accessed;
a removal module for removing the device node corresponding to the second device and a device node corresponding to a controller for controlling the second device from the data structure;
an isolation module for isolating any data signals which are transmitted between the second device and the second device controller from being transmitted from the second device controller to the second device;
a power module for powering off the second device, such that the second device can be removed from the computer system.

24. The computer program product according to claim 23, wherein the first device controller and the second device controller are the same controller.

25. The computer program product according to claim 23, further comprising a switch module for connecting the isolated data signals to the first device.

26. The computer program product according to claim 23, wherein the removal module includes a submodule for unloading all drivers associated with the second device and the second device controller.

27. The computer program product according to claim 16, wherein the first device is one of a floppy drive, a hard drive, and a CD-ROM drive.

28. The computer program product according to claim 16, wherein the first device controller is one of an IDE drive controller and a floppy drive controller.

29. The computer program product according to claim 23, wherein the second device is one of a floppy drive, a hard drive, and a CD-ROM drive.

30. The computer program product according to claim 23, wherein the second device controller is one of an IDE drive controller and a floppy drive controller.

31. A computer system for enumerating a first device present in a computer system to make the first device recognizable to the computer system, the computer system having a memory and an operating system which uses a data structure stored in the memory for establishing a working configuration of the computer system, the data structure having one or more device nodes corresponding to devices present in the computer system, said data structure being separate from a registry of the operating system, the computer system comprising:

a first component to provide an indication to the operating system that the first device has been inserted into the computer system while the computer system is in operation;

a second component to enumerate a first device controller for controlling the first device in response to the indication;

a third component to enumerate a first device controller driver associated with the first device controller in response to the enumeration of the first device controller;

a fourth component to locate, with the initialized first device controller driver, an enumerator associated with the first device controller; and a fifth component to enumerate the first device with the located enumerator, wherein the first device controller driver is only capable of locating the enumerator associated with the first device controller when the first device controller driver is initialized.

* * * * *